(12) United States Patent
Aquil et al.

(10) Patent No.: US 11,493,949 B2
(45) Date of Patent: Nov. 8, 2022

(54) CLOCKING SCHEME TO RECEIVE DATA

(71) Applicant: Qualcomm Incorporated, San Diego, CA (US)

(72) Inventors: Farrukh Aquil, San Diego, CA (US); Mahalingam Nagarajan, San Diego, CA (US); Vaishnav Srinivas, Oceanside, CA (US); Yong Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/832,855

(22) Filed: Mar. 27, 2020

(65) Prior Publication Data

US 2021/0303020 A1 Sep. 30, 2021

(51) Int. Cl.
*G06F 1/12* (2006.01)
*G06F 1/08* (2006.01)
*G06F 13/16* (2006.01)

(52) U.S. Cl.
CPC .................. *G06F 1/08* (2013.01); *G06F 1/12* (2013.01); *G06F 13/1668* (2013.01)

(58) Field of Classification Search
CPC ........... G06F 1/08; G06F 1/12; G06F 13/1669
USPC .............................................. 710/58; 713/501
See application file for complete search history.

(56) References Cited

U.S. PATENT DOCUMENTS

| | | | | |
|---|---|---|---|---|
| 3,824,597 A * | 7/1974 | Berg | ...................... | H04B 10/11 370/215 |
| 4,069,392 A * | 1/1978 | Goldenberg | .......... | H04L 5/1446 370/465 |
| 5,903,490 A * | 5/1999 | Rotem | ................... | G11C 11/418 365/51 |
| 6,034,878 A * | 3/2000 | Osaka | ................. | G06F 13/1684 365/189.16 |
| 6,324,119 B1 * | 11/2001 | Kim | ..................... | G11C 7/1072 365/189.05 |
| 7,042,263 B1 * | 5/2006 | Johnson | ................... | G06F 1/325 326/38 |
| 7,123,524 B1 * | 10/2006 | Han | ..................... | G11C 7/1051 365/193 |
| 7,187,598 B1 * | 3/2007 | Daugherty | .......... | G06F 13/1689 365/189.15 |
| 7,457,175 B1 * | 11/2008 | Griffith | ............... | G06F 13/1689 365/193 |

(Continued)

FOREIGN PATENT DOCUMENTS

WO    WO-2010080172 A1    7/2010

OTHER PUBLICATIONS

International Search Report and Written Opinion—PCT/US2021/023945-ISA/EPO—dated Jun. 28, 2021.

*Primary Examiner* — Paul R. Myers
(74) *Attorney, Agent, or Firm* — Qualcomm Incorporated (57) ABSTRACT

Methods and apparatuses for improve clocking scheme to reduce power consumption are presented. The apparatus includes a host configured to communicate with a memory via a link. The host is further configured to receive a first clock from the memory; to receive, based on the first clock, data from the memory, in a first mode of a read operation; to generate a second clock, the second clock being generated independent of the first clock; and to receive, based on the second clock, data from the memory, in a second mode of the read operation.

20 Claims, 5 Drawing Sheets

(56) References Cited

U.S. PATENT DOCUMENTS

| | | | | |
|---|---|---|---|---|
| 8,417,856 B1* | 4/2013 | Reich | G01D 21/00 | 702/56 |
| 8,423,703 B2* | 4/2013 | Jo | G06F 3/0659 | 711/103 |
| 8,930,742 B2* | 1/2015 | Wessel | G06F 13/423 | 713/501 |
| 9,324,409 B1* | 4/2016 | Magee | G11C 7/1066 | |
| 9,728,236 B1* | 8/2017 | Sankaranarayanan | G11C 7/1075 | |
| 9,742,603 B1* | 8/2017 | Bandi | H04L 7/10 | |
| 2002/0184461 A1* | 12/2002 | Zumkehr | G06F 13/4239 | 711/167 |
| 2004/0098650 A1* | 5/2004 | Rajsuman | G11C 29/56 | 714/742 |
| 2004/0218460 A1* | 11/2004 | Lee | G11C 7/1078 | 365/233.1 |
| 2005/0060595 A1* | 3/2005 | Kurts | H03K 5/19 | 713/600 |
| 2006/0259805 A1* | 11/2006 | Rodriquez | G06F 1/12 | 713/400 |
| 2007/0028060 A1 | 2/2007 | Ware et al. | | |
| 2007/0094454 A1* | 4/2007 | Brundula | G06F 12/0638 | 711/154 |
| 2007/0121393 A1* | 5/2007 | Dietrich | G11C 7/1066 | 365/194 |
| 2008/0005518 A1* | 1/2008 | Gillingham | G06F 13/4243 | 711/167 |
| 2008/0071966 A1* | 3/2008 | Hughes | G11C 7/1093 | 711/100 |
| 2008/0192563 A1* | 8/2008 | Cho | G11C 11/4076 | 365/233.17 |
| 2009/0006776 A1* | 1/2009 | Spry | G06F 13/1689 | 711/154 |
| 2011/0013452 A1* | 1/2011 | Watanabe | G11C 7/12 | 365/185.25 |
| 2011/0040902 A1* | 2/2011 | Housty | G06F 11/3037 | 710/15 |
| 2011/0164464 A1* | 7/2011 | Sawada | G11C 29/12 | 365/201 |
| 2011/0170584 A1* | 7/2011 | To | H04L 7/10 | 375/224 |
| 2011/0242924 A1* | 10/2011 | Kim | G11C 8/12 | 365/230.03 |
| 2012/0106276 A1* | 5/2012 | Kim | G11C 29/46 | 365/193 |
| 2013/0159615 A1* | 6/2013 | Brandl | G06F 13/1689 | 711/105 |
| 2014/0321229 A1* | 10/2014 | Duffner | G11C 7/1009 | 365/233.13 |
| 2015/0340071 A1* | 11/2015 | Chen | G11C 7/22 | 365/189.02 |
| 2017/0054549 A1 | 2/2017 | Stott et al. | | |
| 2017/0162245 A1 | 6/2017 | Song et al. | | |
| 2017/0192913 A1 | 7/2017 | Hsu et al. | | |
| 2018/0005686 A1 | 1/2018 | Oh et al. | | |
| 2018/0060171 A1* | 3/2018 | Suh | G06F 11/1048 | |
| 2018/0164845 A1* | 6/2018 | Christiansen | G06F 13/4295 | |
| 2019/0018737 A1* | 1/2019 | Kim | G06F 11/1446 | |
| 2019/0139589 A1* | 5/2019 | Song | G11C 8/06 | |
| 2019/0163652 A1 | 5/2019 | Kim et al. | | |
| 2019/0172512 A1 | 6/2019 | Oh et al. | | |
| 2019/0189226 A1* | 6/2019 | Srivastava | G11C 29/022 | |
| 2019/0237127 A1 | 8/2019 | Moon et al. | | |

* cited by examiner

CLOCKING SCHEME TO RECEIVE DATA

BACKGROUND

Field

The present disclosure relates generally to methods and apparatuses having improved clocking scheme to receive data and more particularly, to methods and apparatuses utilizing an internal clock generated by a host to receive data from a memory.

Background

A computing device (e.g., a laptop, a mobile phone, etc.) may include one or several processors to perform various functions, such as telephony, wireless data access, and camera/video function, etc. A memory is an important component of the computing device. The one processor may be coupled to the memory to perform the aforementioned computing functions. For example, the one processor may fetch instructions from the memory to perform the computing function and/or to store within the memory temporary data for processing these computing functions, etc. Improvements in performance of the memory would likewise improve the computing device.

SUMMARY

This summary identifies features of some example aspects and is not an exclusive or exhaustive description of the disclosed subject matter. Additional features and aspects are described and will become apparent to persons skilled in the art upon reading the following detailed description and viewing the drawings that form a part thereof.

An apparatus in accordance with at least one embodiment includes a host configured to communicate with a memory via a link. The host is further configured to receive a first clock from the memory; to receive, based on the first clock, data from the memory, in a first mode of a read operation; to generate a second clock, the second clock being generated independent of the first clock; and to receive, based on the second clock, data from the memory, in a second mode of the read operation.

Another apparatus in accordance with at least one embodiment includes a host configured to communicate with a memory via a link. The host is further configured to receive a clock at a frequency from the memory in a training mode; to receive, based on the clock, data from the memory, in a first mode of a read operation; to disable the memory from generating the clock; and to receive data from the memory at the frequency, in the second mode of the read operation with the clock disabled.

A method to reduce power in a system includes receiving, by a host, a first clock from a memory; receiving, by the host and based on the first clock, data from the memory, in a first mode of a read operation; generating, by the host, a second clock, the second clock being generated independent of the first clock; and receiving, by the host and based on the second clock, data from the memory.

BRIEF DESCRIPTION OF THE DRAWINGS

Various aspects of apparatus and methods will now be presented in the detailed description by way of example, and not by way of limitation, with reference to the accompanying drawings, wherein.

DETAILED DESCRIPTION

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well known structures and components are shown in block diagram form to avoid obscuring such concepts.

As used herein, the term "coupled to" in the various tenses of the verb "couple" may mean that element A is directly connected to element B or that other elements may be connected between elements A and B (i.e., that element A is indirectly connected with element B), to operate certain intended functions. For example, the term "coupled" may mean that elements A and B communicate or having a transfer of information, either directly or via other elements.

In cases of electrical components, the term "coupled to" may also be used herein to mean that a wire, trace, or other electrically conductive material is used to electrically connect elements A and B (and any components electrically connected therebetween). In some examples, the term "coupled to" may mean a transfer of electrical energy between elements A and B, to operate certain intended functions. In some examples, the term "electrically connected" or "directly coupled" may mean having an electric current or configurable to having an electric current flowing between the elements A and B. For example, the elements A and B may be connected via resistors, transistors, or an inductor, in addition to a wire, trace, or other electrically conductive material and components. Furthermore, for radio frequency functions, the elements A and B may be "electrically connected" via a capacitor.

The terms "first," "second," "third," etc. are employed for ease of reference and may not carry substantive meanings. Likewise, names for components/modules may be adopted for ease of reference and might not limit the components/modules. For example, such non-limiting names may include "enable" circuit. In some examples, modules and components presented in the disclosure may be implemented by circuits. Such circuits may operate, at least in part, in accordance with software/firmware instructions.

The terms "bus system" and/or "signal connection" may provide that elements coupled thereby may exchange information therebetween, directly or indirectly. In such fashion, the terms "bus system" and/or "signal connection" may encompass multiple physical connections as well as intervening stages such as buffers, latches, registers, etc.

In the disclosure, a memory may be embedded with a processor on a semiconductor die or be part of a semiconductor die different from the processor. The memory may perform various functions. For example, the memory may be used as cache, register file, or storage. The memory may be of various kinds. For example, the memory may be static random access memory (SRAM), dynamic random access memory (DRAM), magnetic random access memory (MRAM), NAND flash, or NOR flash, etc.

As demands grow for the computing device to perform more functions with increasing speed, power issue grows as well. While power savings may be of particular interest in mobile computing devices, non-mobile devices may also benefit from reduced power consumption to reduce waste heat generation. Thus, computing devices of various sorts may benefit from memory systems having reduced power consumption. Schemes to reduce power consumption are thus desirable.

Methods and apparatuses utilizing an internal, host-generated clock to receive data with data clock disabled are presented. In some examples, in a read mode and/or operation, a host (e.g., incorporating a memory controller) may receive data from a memory via source synchronous clocking. For example, the host may receive read data and a read clock (e.g., read data strobe or RDQS) from the memory. The read data may be synchronized with the read clock such that the host may receive (e.g., latch, sample, or capture) the read data based on the read clock. However, for low speed communications, the host might not need a synchronized data clock to receive read data. Thus, it would be advantageous to disable the read clock to further reduce power consumption for low speed communications.

Methods and apparatuses are presented in the present disclosure by way of non-limiting examples of Low-Power Double Data Rate (LPDDR) Synchronous Dynamic Random Access Memory (SDRAM). For example, the LPDDR memory operating in accordance with LPDDR specification promulgated by Joint Electronic Device Engineering Council (JEDEC). Such LPDDR specification may be LPDDR5. Moreover, read data is adopted as an example of data in this disclosure. In some examples, the term "data" may refer to information provided by the memory to a host.

Figure 1:
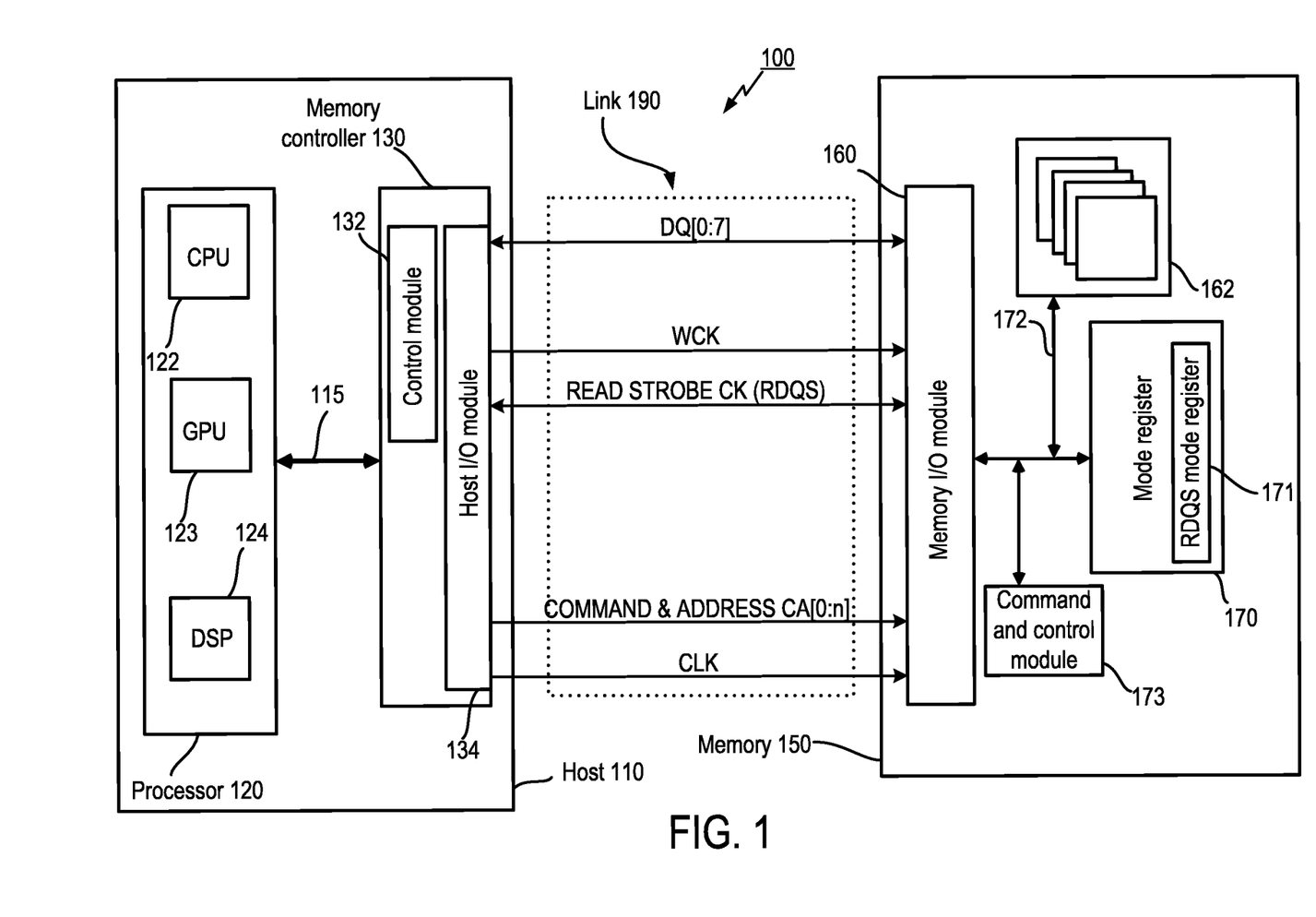
FIG. 1 illustrates an apparatus incorporating a host, a memory, and a link coupling the host and the memory, in accordance with certain aspects of the disclosure.

FIG. 1 illustrates an apparatus 100 incorporating a host 110, a memory 150, and a link 190 coupling the host 110 and the memory 150, in accordance with certain aspects of the disclosure. The apparatus 100 may be, for example, one of computing systems (e.g., servers, datacenters, desktop computers), mobile computing device (e.g., laptops, cell phones, vehicles, etc.), Internet of Things devices, virtual reality (VR) systems, or augmented reality (AR) systems, etc. The host 110 may be configured to communicate (e.g., read, write, request for information, interrupts, etc.) with the memory 150 via the link 190. FIG. 1 illustrates that host includes the at least one processor 120 coupled to a memory controller 130 via a bus system 115, the at least one processor 120 being coupled to the memory 150 via the memory controller 130 and the link 190. The memory may be an LPDDR DRAM (e.g., LPDDR5). The host 110, the memory 150, and/or the link 190 may operate according to an LPDDR (e.g., LPDDR5) specification.

The host 110 may include at least one processor 120 coupled to the memory 150 via the link 190 to perform computing functions, such data processing, data communication, graphic display, camera, AR or VR rendering, image processing, etc. For example, the memory 150 may store instructions or data for the at least one processor 120 to perform the aforementioned computing functions. The at least one processor 120 may include a collection of processing logics or one or more central processing units. For example, the at least one processor 120 may be a central processing unit (CPU) 122, a graphic processing unit (GPU) 123, or a digital signal processor (DSP) 124 configured to implement the computing functions. FIG. 1 further illustrates the at least one processor 120 being coupled to the memory controller 130 via the bus system 115.

The memory controller 130 may include a control module 132 and a host I/O module 134. The host I/O module 134 may be configured to output and/or to receive signals on the link 190. The host I/O module 134 may be known as a PHY layer and be configured to control electrical characteristics (e.g., voltage levels, phase, delays, frequencies, etc.) or to receive signals based on the electrical characteristics of signaling on the link 190. The control module 132 may be configured to issue commands (e.g., read, write, or to select operating modes) to the memory 150 via the link 190.

In some examples, the host 110 (e.g., the control module 132) may issue a read command to the memory 150, via the host I/O module 134 and the link 190, to enact a read mode and/or operation. Further, the host 110 (e.g., the host I/O module 134) may be configured to receive a data clock (e.g., RDQS) from the memory 150 via the link 190 for the read mode and/or operation. For reference, the data clock RDQS may be referred to as a first clock. The host 110 (e.g., the memory controller 130) may be further configured to receive, based on the data clock RDQS, read data from the memory 150 via the link 190 (e.g., DQs) in a first mode (e.g., a first setting) of the read mode and/or operation. The first mode may be, for example, a high-speed mode and may enable and utilize the data clock RDQS for the read mode and/or operation. In some example, high-speed and/or low-speed modes or settings are referenced in terms of relativity, and not absolute operating speeds. In some example, the memory 150 may output and provide the data clock RDQS and the read data in synchronization (e.g., phase and/or frequency synchronized) to allow the host I/O module 134 to receive (e.g., to latch, sample, or capture), based on the data clock RDQS (e.g., the first clock), the read data.

The host 110 (e.g., the host I/O module 134) may be further configured generate to adjust the generation of an internal clock (for reference, a second clock) based on the data clock RDQS (e.g., the first clock) received by the host 110. For example, the control module 132 may be configured to issue a training command to the memory 150, via the host I/O module 134 and the link 190, to enact a training mode and/or operation. In response, the host 110, the memory 150, may link 190 may operate the training mode and/or operation. In the training mode and/or operation, the host 110 (e.g., the host I/O module 134) may be configured adjust a generation of the internal clock to synchronize the internal clock in phase and/or frequency with the received data clock RDQS. Such training may be known as read clock window training.

The host 110 (e.g., the control module 132) may be further configured to instruct the memory 150 to disable outputting the data clock RDQS, to communicate in a second mode (e.g., a second setting) of the read mode and/or operation. In some examples, the second mode may correspond to a read mode and/or operation without using the data clock RDQS. In some example, the second mode may be a slow-speed mode or setting. In response, the memory 150 may output read data without outputting the data clock RDQS. The host 110 (e.g., the host I/O module 134) may be further configured to generate the internal clock not from the received data clock RDQS. For example, the host 110 may be configured to generate the internal clock independent of the received data clock RDQS, and/or the data clock RDQS might not be used as an input in the generation of the internal clock.

The host 110 (e.g., the host I/O module 134) may be further configured receive, based on the internal clock generated independent of the data clock RDQS, read data from the memory 150 in the second mode of the read mode and/or operation. In some examples, since the internal clock was adjusted to synchronize with the data clock RDQS in the training operation, the host (e.g., the control module 132) may be configured to receive read data without using the data clock RDQS. For example, the host 110 (e.g., the host I/O module 134) may latch, sample, or capture the read data from the link 190 using the internal clock instead of the data clock RDQS (the memory 150 may stop outputting the data clock RDQS in this case). In such fashion, power consumed by outputting the data clock RDQS and toggling the data clock RDQS in the link 190 could be conserved.

In some examples, the link 190 may be a chip-to-chip or a die-to-die link between the host 110 and the memory 150, the host 110 and the memory 150 being on different dies. In some examples, the link 190 may be an in-die link, the host 110 and the memory 150 being on a same die. For example, the link 190 may include multiple signal lines, including signal lines to transmit unidirectional signals from the host 110 to the memory 150 (e.g., write data clock (WCK), command and address (CA), CA clock (CLK) etc.) and bidirectional directional signals (e.g., data or DQs), read data strobe clock (RDQS), etc.). For example, the CA may include a CAS signaling/pin, a chip select (CS) signaling/pin, and column address (CA) signaling. The link 190 and signaling between the host 110 and the memory 150 may be in accordance with the JEDEC DRAM specification (e.g., LPDDR5).

FIG. 1 illustrates the memory 150 having a memory I/O module 160, a memory array 162, a mode register 170, and a command and control module 173, the components being coupled via a bus system 172. The memory 150 may be configured to communicate with the host 110 via the link 190. For example, the memory 150 may be configured to store write data in the memory array 162, in response to a write command from the host 110 (e.g., a write operation). The write data and the write command may be received from the host 110 via the link 190. The memory 150 may be configured to output data stored in the memory array 162 as read data, in response to a read command from the host 110 (e.g., a read mode and/or operation). The read data and the read command may be received from the host 110 via the link 190. Other communications may include mode register reads and/or writes to adjust operating modes or conditions of the memory 150 and to provide information on the operating modes or conditions of the host 110 and/or the memory 150.

To facilitate communications to/from the host 110, the memory array 162 may be configured to store write data and to output stored data as read data, via the link 190 and the memory I/O module 160, from and to the host 110. The mode register 170, which may include multiple registers, may be configured to store operating modes and/or conditions of the memory 150. The mode register 170 may include a RDQS mode register 171. The host 110 (e.g., the control module 132) may be configured to instruct the memory 150 to disable outputting the data clock RDQS to communicate in the second mode of the read mode and/or operation. For example, the host 110 may turn off the data clock RDQS by accessing (reading or writing) the mode register 170 (e.g., the RDQS mode register 171) via the link 190 and the memory I/O module 160. Consequently, the memory 150 may output read data without outputting the data clock RDQS (e.g., in a second mode of the read mode and/or operation), in response to a mode or setting of the RDQS mode register 171.

The command and control module 173 may be configured to receive commands from the host 110 via the link 190 (e.g., CAs) and the memory I/O module 160. The commands may include read, write, mode register read/write, etc. The commands may include a training mode command that places the memory 150 in a training mode and/or operation. The command and control module 173 may be configured to decode various commands provided by the host 110 (e.g., the memory controller 130) via the link 190 and to arrange the memory 150 to operate according to the commands. For example, the command and control module 173 may be configured to decode a training command that puts the memory 150 into a training mode and/or operation. In the training mode and/or operation, the memory 150 may be configured to output the data clock RDQS at a predetermined frequency (without outputting data).

The memory I/O module 160 may be configured to drive and to receive signals on the link 190. The memory I/O module 160 may be known as a PHY layer and be configured to control electrical characteristics (e.g., voltage levels, phase, delays, frequencies, etc.) or to receive signals based on the electrical characteristics of signaling on the link 190. For example, memory I/O module 160 may be configured to capture (e.g., to sample) write data from the host 110 via the link 190 (e.g., DQs) based on the data clock WCK. In some examples, the memory I/O module 160 may be configured to output read data to the host 110 via the link 190 (e.g., DQs) based on a data clock RDQS in a first mode (e.g., a high-speed setting or mode) of a read mode and/or operation. For example, the host I/O module 134 may be configured to synchronize read data with the data clock RDQS and output the data clock RDQS with read data. In some examples, based on a setting or mode of the RDQS mode register 171, the memory I/O module 160 may be configured to output read data and not the data clock RDQS (e.g., a second mode of the read mode and/or operation).

For a write operation, the at least one processor 120 may issue a write request to the memory controller 130 via the bus system 115. The memory controller 130 may issue a WRITE command via CA and CLK of the link 190 to the memory 150. Write data are provided by the memory controller 130 via DQs of the link 190, clocked by the data clock WCK. In response, the memory 150 stores the write data into the memory array 162, addressed by the WRITE command.

Figure 2:
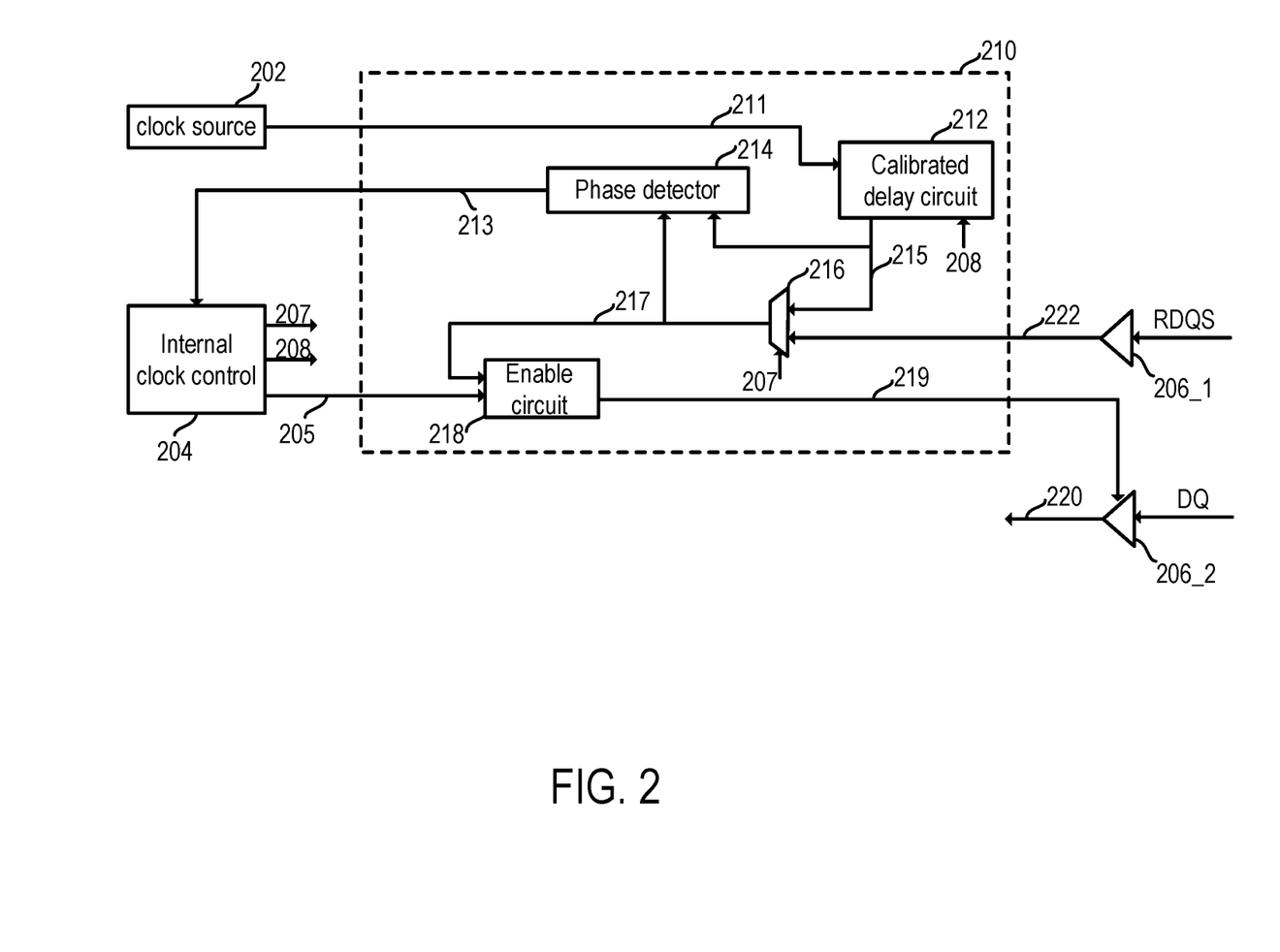
FIG. 2 illustrates portions of the host I/O module of FIG. 1 configured to generate and to adjust the generation of the internal clock, in accordance with certain aspects of the present disclosure.

FIG. 2 illustrates portions of the host I/O module 134 of FIG. 1 configured to generate and to adjust the generation of the internal clock, in accordance with certain aspects of the present disclosure. FIG. 2 illustrates the host 110 components, including a clock source 202, an internal clock module 210, an internal clock control 204, and input circuits 206_1 and 206_2. As illustrated, the internal clock module 210 may include a calibrated delay circuit 212, a phase detector 214, a multiplexer 216, an enable circuit 218, and various signal connections. The input circuits 206_1, 206_2 may be configured to receive signals external to the host 110 and may include, for example, input buffers/latching circuits. The input circuit 206_1 may be configured to receive the data clock RDQS from the memory 150 and output an internal version of the data clock RDQS, based on the received data clock RDQS, onto a signal connection 211. The signal connection 211 may be provided to the internal clock module 210.

In a high-speed mode (e.g., a first setting or mode of a read mode and/or operation), the host 110 may be configured to receive (e.g., to capture, sample, or latch), based on the data clock RDQS, data (e.g., DQs) from the memory 150 in the high-speed mode of the read mode and/or operation. For example, the internal clock module 210 may be configured to provide clocking, based on the received data clock on the signal connection 222, to the input circuit 206_2 via the multiplexer 216, the signal connection 217, the enable circuit 218, and the signal connection 219, in the high-speed mode of the read mode and/or operation.

In a low-speed mode (e.g., a second mode or setting) of the read mode and/or operation, jitters on the received data may be relatively negligible or be absorbed by timing margins. The internal clock module 210 may be further configured to generate the internal clock (e.g., the second clock) on the signal connection 219 independent of the received data clock RDQS, in the low-speed mode of the read mode and/or operation. For example, the data clock RDQS (e.g., the first clock) might not be an input in generating the internal clock (e.g., the second clock). The host 110 may be configured to receive (e.g., via the input circuit 206_2), based on the internal clock on the signal connection 219 (e.g., the second clock) and not the first clock, data (e.g., DQs) from the memory 150. Thus, in one aspect of the disclosure, the host 110 may be configured to instruct the memory 150 to disable outputting the data clock RDQS (e.g., the first clock) to communicate in the low-speed mode (e.g., the second setting or mode of the read mode and/or operation). In such fashion, power consumption for clocking the data clock RDQS on the link 190 may be eliminated.

The clock source 202 may be configured to provide a reference clock on a signal connection 211 to the calibrated delay circuit 212. The calibrated delay circuit 212 may be configured to adjust delay/phase/frequency of the reference clock, based on a control or setting on a signal connection 208. The calibrated delay circuit 212 may be further configured to output a calibrated reference clock, onto a signal connection 215, as an input to the phase detector 214. The calibrated delay circuit 212 may be further configured to output the calibrated reference clock, onto the signal connection 215, as an input to a multiplexer 216. The control signal on a signal connection 208 may be outputted by an internal clock control 204.

The host 110 may receive the data clock RDQS from the memory 150 via the input circuit 206_1, which may be configured to output, as a received data clock RDQS, onto a signal connection 222 and as another input to the multiplexer 216. The multiplexer 216 may be configured to select among the calibrated reference clock on the signal connection 215 and the received data clock RDQS on the signal connection 222, based on a select signal on a signal connection 207, and configured to output a selected signal onto a signal connection 217. Via the signal connection 217, the multiplexer 216 may be configured to output the selected signal to the phase detector 214 and an enable circuit 218. The select signal on the signal connection 207 may be outputted by the internal clock control 204.

The enable circuit 218 may be configured to output the selected signal on the signal connection 217 to the signal connection 219 as the internal clock, based on an enable signal on a signal connection 205. The enable signal on the signal connection 205 may be outputted by the internal clock control 204. For example, the enable circuit 218 may be configured to enable or disable outputting the internal clock onto the signal connection 219 based on the enable signal on the signal connection 205. In some examples, the enable circuit 218 may be configured to output the internal clock (e.g., the second clock), outputting the internal clock being gated an enable signal. For example, the enable circuit 218 may include a gating circuit where an output is gated by the enable signal. In such fashion, a number of pulses of the internal clock may correspond (e.g., controlled by) an ON duration of the enable signal.

In a training mode and/or operation, the memory 150 may be configured to output the data clock RDQS at a frequency to allow the host 110 to calibrate internal settings in a generation of the internal clock to receive data (e.g., DQs) from the memory 150. For example, the host 110 may be configured to adjust, in the training mode and/or operation, the generation of the internal clock based on the data clock RDQS. Examples of such training mode and/or operation are presented herein. The internal clock control 204 may be configured to output the select signal on the signal connection 207 such that the multiplexer 216 selects the received data clock RDQS on the signal connection 222 and outputs to the phase detector 214 on the signal connection 217. The phase detector 214 may be configured to detect a phase difference between the received data clock RDQS outputted by the multiplexer 216 and the calibrated reference clock on the signal connection 215 (from the calibrated delay circuit 212). The phase detector 214 may be further configured to output the phase difference, via the signal connection 213, to the internal clock control 204.

In response to the phase difference on the signal connection 213, the internal clock control 204 may be configured to adjust a setting of the calibrated delay circuit 212 via the signal connection 208. In a subsequent cycle in the training mode and/or operation, the calibrated delay circuit 212 may be configured to adjust the reference clock received on the signal connection 211, based on the setting on the signal connection 208, and to output the calibrated reference clock to the multiplexer 216 and to the phase detector 214 (via the signal connection 215). In such fashion, the setting of the calibrated delay circuit 212 may be adjusted such that the outputted calibrated reference clock may be in phase and/or frequency synchronization with the received data clock RDQS. Such setting may be stored (e.g., by the internal clock control 204) to generate the internal clock (e.g., the second clock), via the enable circuit 218, in a read mode and/or operation subsequent to the training mode and/or operation. In such fashion, the host 110 may be configured to synchronize the internal clock (e.g., the second clock) with the data clock RDQS (e.g., the first clock) to adjust the generation of the internal clock.

In a read mode and/or operation, the memory 150 may be configured to output data stored in the memory array 162 (see FIG. 1) via the link 190 (e.g., DQs), in response to a read command from the host 110. The host 110 may be configured to utilize different clock schemes to receive the data from the memory 150 in different settings or modes of the read mode and/or operation. For example, in the high-speed mode (e.g., the first mode or setting), the host 110 may be configured to receive, based on the data clock RDQS, the data on DQs via input circuit 206_2. In the low-speed mode (e.g., the second mode or setting), the host 110 may be configured to receive, based on the internal clock on the signal connection 219, the data on DQs via input circuit 206_2.

In the low-speed mode, the internal clock might be generated independent of (e.g., not from) the data clock RDQS. For example, in the low-speed mode, the internal clock control 204 may be configured to, via signal connection 208, cause the calibrated delay circuit 212 to output a calibrated reference clock onto the signal connection 215. In the low-speed mode, the calibrated reference clock may be in phase and/or frequency synchronization with an expected data clock RDQS, as a result of the training mode.

Thus, the calibrated delay circuit 212 may output a version of the internal clock onto the signal connection 215. The multiplexer 216 may be configured to select the calibrated reference clock on the signal connection 215 (and not select the received data clock RDQS on the signal connection 222) to output to the enable circuit 218, in generating the internal clock on the signal connection 219. In some examples, the terms "high-speed" and "low-speed" denote relative operating or I/O speeds, and not necessarily defined in by absolute speeds.

In some examples, the multiplexer 216 may be configured to select among the host 110 receiving data based on the data clock RDQS and receiving data based on the internal clock generated independent of (e.g., not generated from) the data clock RDQS. For example, in the high-speed mode, the internal clock control 204 may be configured to arrange the select signal on the signal connection 207 to facilitate the multiplexer 216 to select the received data clock on the signal connection 222. The input circuit 206_2 may be configured to receive data on DQs based on (e.g., clocked by) the selected received data clock RDQS (via the signal connection 219, the enable circuit 218, the signal connection 217). In the low-speed mode, the internal clock control 204 may be configured to arrange the select signal on the signal connection 207 to facilitate the multiplexer 216 to select the calibrated reference clock on the signal connection 215. The calibrated delay circuit 212 may be configured to output the calibrated reference clock onto the signal connection 215, based on a mode provided on the signal connection 208.

The internal clock control 204 may be configured to store the setting obtained from a previous training mode and/or operation. The setting could be such that the calibrated reference clock on the signal connection 215 (and therefore, the internal clock on the signal connection 219) would be in phase and/or frequency synchronization with the data clock RDQS. Further in the low-speed mode, the enable circuit 218 may be configured to enable the internal clock onto the signal connection 219, based on an output of the multiplexer 216 on the signal connection 217. In such fashion, in the low-power mode, the internal clock is generated independent of (e.g., not generated from) the data clock RDQS. For example, the data clock RDQS is not an input (e.g., not selected by the multiplexer 216) in generating the internal clock on the signal connection 219 used to receive data on the DQs.

As presented above, the enable circuit 218 may configured to enable receiving data from the memory 150 in both the high-speed and low-speed modes the read mode and/or operation, based on the enable signal on the signal connection 205. The internal clock control 204 may be configured to generate the enable signal on the signal connection 205 based on (e.g., having an ON period corresponding to) a burst length of the read mode and/or operation. For example, based on a clock period of the data clock RDQS and/or the internal clock, the internal clock control 204 may be configured to have the enable signal on for an on period corresponding to a number of the burst length multiplied by the clock period. In such fashion, the burst length control and the enable circuit 218 are used for both the high-speed and the low-speed modes of the read mode and/or operation, reducing an overhead of the improved clock scheme to receive data in the present disclosure.

Figure 3:
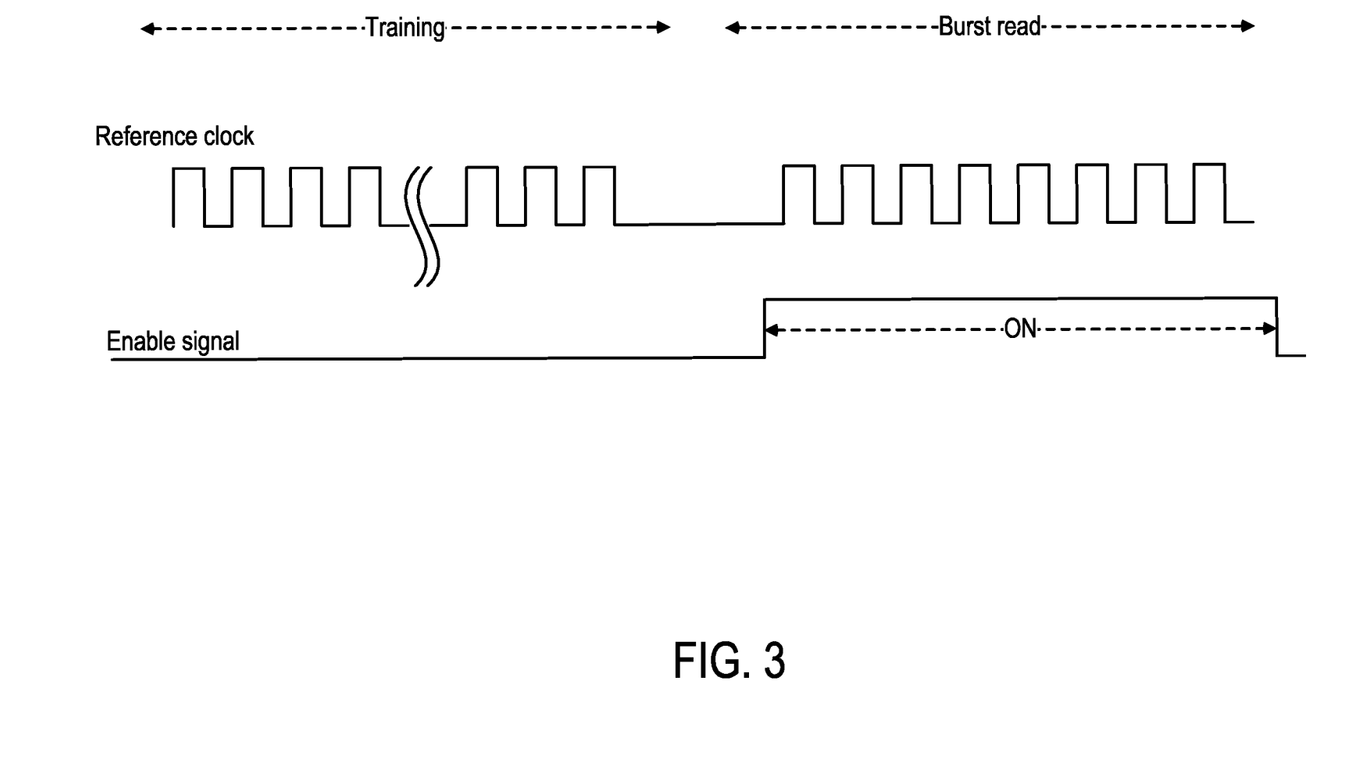
FIG. 3 illustrates a relationship between the enable signal and clocking, in accordance with circuit aspects of the present disclosure.

FIG. 3 illustrates a relationship between the enable signal (e.g., on the signal connection 205 in FIG. 2) and clocking, in accordance with circuit aspects of the present disclosure. In the training mode and/or operation, the enable signal does not need to be turned on, as no data are received. In a burst operation of the read mode and/or operation, the enable signal is ON for a period corresponding to a burst length of data (e.g., DQs) from the memory 150.

In some examples, referring to FIGS. 1 and 2, the apparatus 100 includes the host 110 configured to communicate with the memory 150 via the link 190. The host 110 may be further configured to receive a clock (e.g., the data clock RDQS) at a frequency from the memory 150 in a training mode. In the training mode, the host 110 may train a generation of an internal clock at synchronize with clock at the frequency. The host 110 may be further configured to receive, based on the clock, data from the memory 150, in a first mode of a read operation. For example, in a high-speed mode of the read mode and/or operation, the host 110 may receive data on DQs based on the data clock RDQS.

The host 110 may be further configured to disable the memory 150 from generating the clock. For example, the host 110 may write to the RDQS mode register 171 (see FIG. 1) to inform the memory 150 to disable a generation of the data clock RDQS. The host 110 may be further configured to receive data from the memory 150 at the frequency, in the second mode of the read operation with the clock disabled. For example, in a low-speed mode, the memory 150 may output data at the DQs with the data clock RDQS disabled. The data at the DQs may be outputted at the frequency at which the host 110 training the internal clock (e.g., at the signal connection 219). Accordingly, the host 110 would be receive data at the DQs at the frequency using the internal clock, in the low-speed mode of the read operation with the data clock RDQS disabled.

Figure 4:
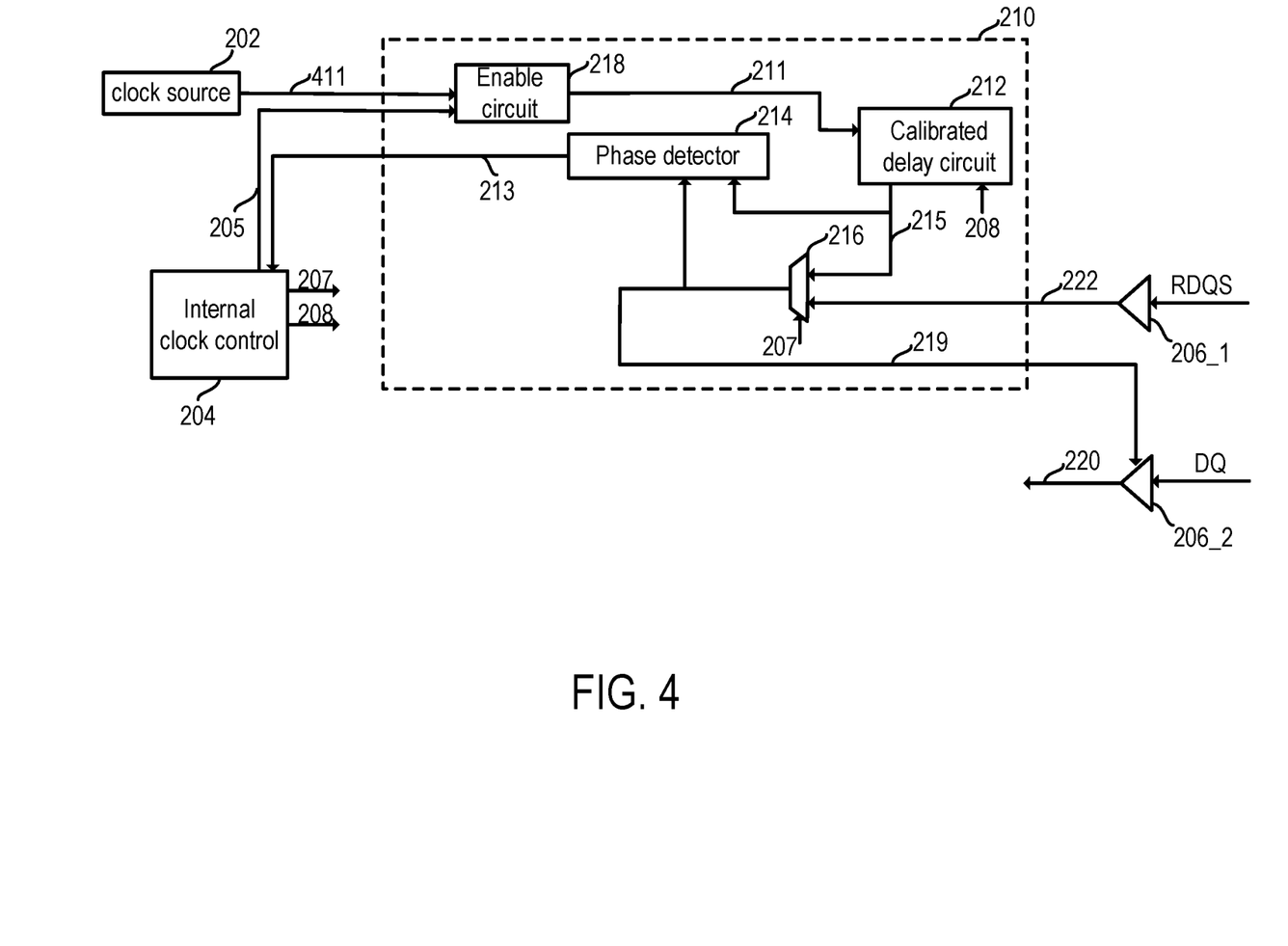
FIG. 4 illustrates another example of portions of the host I/O module of FIG. 1 configured to generate and to adjust the generation of the internal clock, in accordance with certain aspects of the present disclosure.

FIG. 4 illustrates another example of portions of the host I/O module 134 of FIG. 1 configured to generate and to adjust the generation of the internal clock, in accordance with certain aspects of the present disclosure. In reference to FIG. 2, reference characters are preserved for performing or having same or similar functions/structures. In FIG. 4, the clock source 202 may be configured to provide a reference clock on a signal connection 411 to an enable circuit 218. The enable circuit 218 may be configured to enable generating the second clock in the low-speed or second mode and to disable generating the second clock in the high-speed or first mode of the read mode and/or operation, based on an enable signal on the signal connection 205. For example, in the low-speed mode, the enable circuit 218 may be configured to provide the reference clock onto the signal connection 211 and to provide the reference clock to the calibrated delay circuit 212.

The calibrated delay circuit 212 may be configured to output a calibrated reference clock, based on a setting provided on the signal connection 208, onto the signal connection 215. Based on the training mode, the internal clock control 204 may be configured to provide the setting on the signal connection 208 such that the calibrated reference clock on the signal connection 215 correspond to a version of the internal clock. For example, the calibrated reference clock or the version of the internal clock outputted by the calibrated delay circuit 212 onto the signal connection 215 may be in phase and/or frequency synchronization of the data clock RDQS in the slow-speed mode. The data clock RDQS in the slow-speed mode might not be outputted by the memory 150 or received by the host 110, in some examples. In the high-speed mode, the enable circuit 218 may be configured to disable generating the internal clock at an input of the multiplexer 216 (e.g., on the signal connection 215). For example, the enable circuit 218 may be configured to not provide the reference clock onto the signal connection 211 and to the calibrated delay circuit 212. In such fashion, since the internal clock is not used on the high-speed mode of the read mode and/or operation, power to generate the internal clock would be saved.

Figure 5:
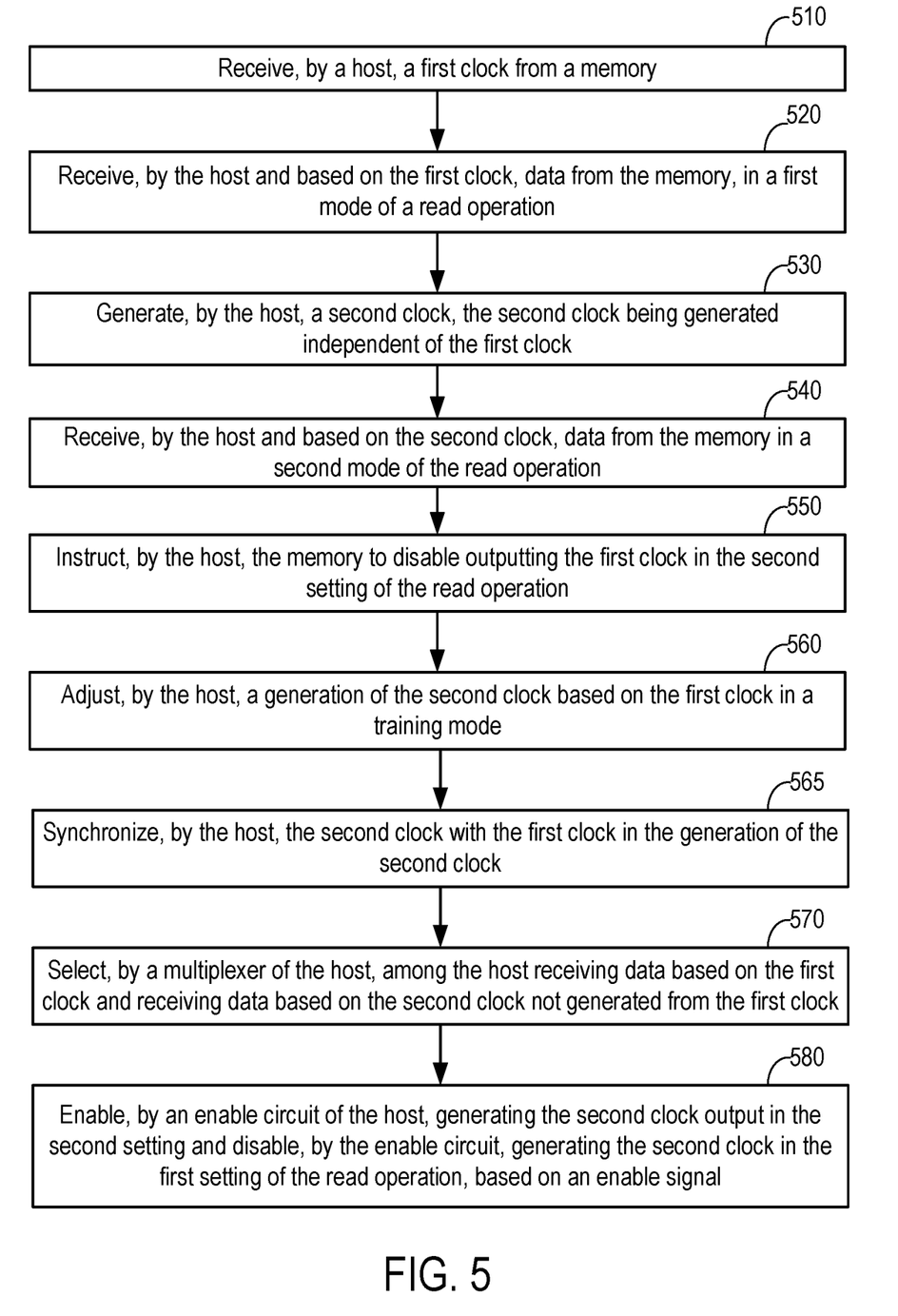
FIG. 5 illustrates operations of an improved clocking scheme between the host and the memory over the link of FIG. 1, in accordance with certain aspects of the present disclosure.

FIG. 5 illustrates operations of an improved clocking scheme between the host 110 and the memory 150 over the link 190 of FIG. 1, in accordance with certain aspects of the present disclosure. These operations may be performed by, for example, structures presented with FIGS. 1 and 2. At 510, a first clock is received by a host from a memory. For example, referring to FIG. 1, the host 110, via the host I/O module 134, receives the data clock RDQS from the memory 150. Referring to FIG. 2, the host including the input circuit 206_1 receives the data clock RDQS from the memory 150 and outputs the received data clock RDQS onto the signal connection 222.

At 520, data from the memory are received by the host based on a first clock, in a first mode of a read mode and/or operation. For example, referring to FIG. 2, data on the DQs are received by the input circuit 206_2 based on the received data clock RDQS, in a high-speed mode of a read mode and/or operation.

At 530, a second clock is generated by the host, the second clock being generated independently of the first clock. For example, referring to FIG. 2, the host 110 generates the internal clock on the signal connection 219 not from the data clock RDQS in a low-speed mode of the read mode and/or operation. In the low-speed mode, the internal clock control 204 arranges the select signal on the signal connection 207 to facilitate the multiplexer 216 to select the calibrated reference clock on the signal connection 215. The calibrated delay circuit 212 outputs the calibrated reference clock onto the signal connection 215, based on a setting provided on the signal connection 208.

The internal clock control 204 stores the setting obtained from a previous training mode and/or operation. The setting is such that the calibrated reference clock on the signal connection 215 (and therefore, the internal clock on the signal connection 219) would be in phase and/or frequency synchronization with the data clock RDQS. Further in the low-speed mode, the enable circuit 218 enables the internal clock onto the signal connection 219, based on an output of the multiplexer 216 on the signal connection 217. In such fashion, in the low-power mode, the internal clock is generated independent of the data clock RDQS. For example, the data clock RDQS is not an input (e.g., not selected by the multiplexer 216) in generating the internal clock on the signal connection 219 used to receive data on the DQs.

At 540, data are received by the host based on the second clock from the memory in a second mode of the read operation. For example, referring to FIG. 1, data on DQs are received by the host 110 from the memory 150. Referring to FIG. 2, data on the DQs are received by the input circuit 206_2 based on clocking on the signal connection 219, in a low-speed mode of the read mode and/or operation.

At 550, the memory is instructed by the host to disable outputting the first clock to communicate in the second mode of the read operation. For example, referring to FIG. 1, the host 110 instructs the memory 150 to off the data clock RDQS by accessing (reading or writing) the mode register 170 (e.g., the RDQS mode register 171) via the link 190 and the memory I/O module 160. Consequently, the memory 150 outputs read data without outputting the data clock RDQS (e.g., in a low-speed mode or the second mode of the read mode and/or operation), in response to a mode or setting of the RDQS mode register 171. In such fashion, power to toggle the data clock RDQS is conserved.

At 560, a generation of the second clock is adjusted by the host based on the first clock in a training mode. At 565, the second clock is synchronized with the first clock in the generation of the second clock. For example, referring to FIG. 2, in a training mode and/or operation, the memory 150 outputs the data clock RDQS to allow the host 110 to calibrate internal settings in a generation of the internal clock to receive data (e.g., DQs) from the memory 150. For example, the host 110 adjusts, in the training mode and/or operation, the generation of the internal clock based on the data clock RDQS. The internal clock control 204 outputs the select signal on the signal connection 207 such that the multiplexer 216 selects the received data clock RDQS on the signal connection 222 and outputs to the phase detector 214 on the signal connection 217. The phase detector 214 detects a phase difference between the received data clock RDQS outputted by the multiplexer 216 and the calibrated reference clock on the signal connection 215 (from the calibrated delay circuit 212). The phase detector 214 outputs the phase difference, via the signal connection 213, to the internal clock control 204.

In response to the phase difference on the signal connection 213, the internal clock control 204 adjusts a setting of the calibrated delay circuit 212 via the signal connection 208. In a subsequent cycle in the training mode and/or operation, the calibrated delay circuit 212 adjusts the reference clock received on the signal connection 211, based on the setting on the signal connection 208, and outputs the calibrated reference clock to the multiplexer 216 and to the phase detector 214 (via the signal connection 215). In such fashion, the setting of the calibrated delay circuit 212 is adjusted such that the outputted calibrated reference clock is in phase and/or frequency synchronization with the received data clock RDQS. Such setting is be stored (e.g., by the internal clock control 204) to generate the internal clock (e.g., the second clock), via the enable circuit 218, in a read mode and/or operation subsequent to the training mode and/or operation. In such fashion, the host 110 synchronizes the internal clock (e.g., the second clock) with the data clock RDQS (e.g., the first clock) to adjust the generation of the internal clock.

At 570, among the host receiving data based on the first clock and receiving data based on the second clock generated independent of the first clock is selected by a multiplexer of the host. For example, referring to FIG. 2, the multiplexer 216 selects among the host 110 receiving data based on the data clock RDQS and receiving data based on the internal clock not generated from the data clock RDQS. For example, in the high-speed mode, the internal clock control 204 arranges the select signal on the signal connection 207 to facilitate the multiplexer 216 to select the received data clock on the signal connection 222. The input circuit 206_2 receives data on DQs based on (e.g., clocked by) the selected received data clock RDQS (via the signal connection 219, the enable circuit 218, the signal connection 217). In the low-speed mode, the internal clock control 204 arranges the select signal on the signal connection 207 to facilitate the multiplexer 216 to select the calibrated reference clock on the signal connection 215. The calibrated delay circuit 212 outputs the calibrated reference clock onto the signal connection 215, based on a setting provided on the signal connection 208.

The internal clock control 204 stores the setting obtained from a previous training mode and/or operation. The setting is such that the calibrated reference clock on the signal connection 215 (and therefore, the internal clock on the signal connection 219) would be in phase and/or frequency synchronization with the data clock RDQS. Further in the low-speed mode, the enable circuit 218 enables the internal clock onto the signal connection 219, based on an output of the multiplexer 216 on the signal connection 217. In such fashion, in the low-power mode, the internal clock is generated independent of the data clock RDQS. For example, the data clock RDQS is not an input (e.g., not selected by the multiplexer 216) in generating the internal clock on the signal connection 219 used to receive data on the DQs.

At 580, generating the second clock in the second mode is enabled and generating the second clock in the first mode of the read operation is disabled by an enable circuit of the host, based on an enable signal. Referring to FIG. 4, for example, the clock source 202 provides a reference clock on a signal connection 411 to an enable circuit 218. The enable circuit 218 enables generating the second clock in the low-speed or second mode and to disable generating the second clock in the high-speed or first mode of the read mode and/or operation, based on an enable signal on the signal connection 205. For example, in the low-speed mode, the enable circuit 218 provides the reference clock onto the signal connection 211 and to provide the reference clock to the calibrated delay circuit 212.

The calibrated delay circuit 212 outputs a calibrated reference clock, based on a setting provided on the signal connection 208, onto the signal connection 215. Based on the training mode, the internal clock control 204 provides the setting on the signal connection 208 such that the calibrated reference clock on the signal connection 215 correspond to a version of the internal clock. For example, the calibrated reference clock or the version of the internal clock outputted by the calibrated delay circuit 212 onto the signal connection 215 is in phase and/or frequency synchronization of the data clock RDQS in the slow-speed mode. The data clock RDQS in the slow-speed mode might not be outputted by the memory 150 or received by the host 110, in some examples. In the high-speed mode, the enable circuit 218 disables generating the internal clock at an input of the multiplexer 216 (e.g., on the signal connection 215). For example, the enable circuit 218 provides the reference clock onto the signal connection 211 and to the calibrated delay circuit 212. In such fashion, since the internal clock is not used on the high-speed mode of the read mode and/or operation, power to generate the internal clock would be saved.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus, comprising:
   a host configured to communicate with a memory via a link, the host being further configured to:
   receive a first clock from the memory,
   receive, based on the first clock, data from the memory synchronously, in a high-speed mode of a read operation,
   generate a second clock, the second clock being generated independent of the first clock in a low-speed mode of the read operation and being an internal clock of the host, wherein no read clock is between the host and the memory in the low-speed mode, and
   receive, based on the second clock, data from the memory synchronously, in the low-speed mode of the read operation.

2. The apparatus of claim 1, the host being further configured to instruct the memory to disable outputting the first clock in the low-speed mode of the read operation.

3. The apparatus of claim 2, the host being further configured to adjust, in a training operation, a generation of the second clock based on the first clock.

4. The apparatus of claim 3, the host being further configured to synchronize the second clock with the first clock to adjust the generation of the second clock in the training operation.

5. The apparatus of claim 4, the host further comprising a multiplexer, the multiplexer being configured to select among the host receiving data based on the first clock and receiving data based on the second clock generated independent of the first clock.

6. The apparatus of claim 5, the host further comprising an enable circuit, the enable circuit being configured to enable generating the second clock in the low-speed mode and to disable generating the second clock in the high-speed mode of the read operation, based on an enable signal.

7. The apparatus of claim 6, the enable circuit being further configured to disable generating the second clock in the high-speed mode of the read operation at an input of the multiplexer.

8. The apparatus of claim 6, the enable signal having an on period corresponding to a burst length of data from the memory.

9. The apparatus of claim 6, further comprising a device selected from one of a computing system, a mobile computing system, an Internet of Things device, a virtual reality system, or an augmented reality system, the device incorporating the memory, the host, and the link.

10. The apparatus of claim 9, the first clock comprising a read data strobe.

11. A method to reduce power in a system, comprising:
receiving, by a host, a first clock from a memory;
receiving, by the host and based on the first clock, data from the memory synchronously, in a high-speed mode of a read operation,
generating, by the host, a second clock, the second clock being generated independent of the first clock in a low-speed mode of the read operation and being an internal clock of the host, wherein no read clock is between the host and the memory in the low-speed mode, and
receiving, by the host and based on the second clock, data from the memory synchronously, in the low-speed mode of the read operation.

12. The method of claim 11, further comprising
instructing, by the host, the memory to disable outputting the first clock in the low-speed mode of the read operation.

13. The method of claim 12, further comprising
adjusting, by the host, a generation of the second clock based on the first clock in a training mode.

14. The method of claim 13, the generating the second clock further comprising:
synchronizing, by the host, the second clock with the first clock in a generation of the second clock in the training mode.

15. The method of claim 14, further comprising
selecting, by a multiplexer of the host, among the host receiving data based on the first clock and receiving data based on the second clock not generated from the first clock.

16. The method of claim 15, further comprising
enabling, by an enable circuit of the host, generating the second clock in the low-speed mode, and
disabling, by the enable circuit, generating the second clock in the high-speed mode of the read operation, based on an enable signal.

17. The method of claim 16, the enable circuit disabling generating the second clock in the high-speed mode of the read operation at an input of the multiplexer.

18. The method of claim 16, the enable signal having an on period corresponding to a burst length of data from the memory.

19. The method of claim 16, the first clock comprising a read data strobe.

20. An apparatus, comprising:
a host configured to communicate with a memory via a link, the host being further configured to:
receive a clock at a frequency from the memory in a training mode,
receive, based on the clock, data from the memory synchronously, in a high-speed mode of a read operation,
disable the memory from generating the clock,
receive data from the memory at the frequency synchronously, in a low-speed mode of the read operation with the clock disabled and without read clock signal between the host and the memory.

* * * * *